US006588326B2

(12) United States Patent
Taplan et al.

(10) Patent No.: US 6,588,326 B2
(45) Date of Patent: Jul. 8, 2003

(54) COOKING STATION WITH A GLASS-CERAMIC BOWL HAVING A SUNKEN CURVED HEATING SURFACE

(75) Inventors: Martin Taplan, Rheinboellen (DE); Christof Koester, Velbert (DE); Helga Goetz, Heidesheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/186,417

(22) Filed: Jul. 1, 2002

(65) Prior Publication Data

US 2003/0005829 A1 Jan. 9, 2003

(30) Foreign Application Priority Data

Jul. 6, 2001 (DE) ........................................ 101 32 899

(51) Int. Cl.[7] ............................ A23L 1/00; A47J 37/00; A47J 37/06; H05B 6/12; F24C 15/10

(52) U.S. Cl. ............................................ 99/422; 99/426

(58) Field of Search .......................... 99/339, 340, 403, 99/422–425, 426, 451, DIG. 13, DIG. 14; 219/620, 621, 624, 625, 647, 634, 660, 432, 433, 430, 438, 439, 521, 457, 459; 126/390.1; 220/573.1, 574, 573.2; D7/355

(56) References Cited

U.S. PATENT DOCUMENTS 3,213,849 A * 10/1965 Hirsch ...................... 99/331 X
3,636,299 A * 1/1972 Stewart, Jr. ............... 108/94 X
3,851,599 A * 12/1974 Bridges ....................... 108/25
3,972,419 A * 8/1976 Short .......................... 211/78
4,435,638 A * 3/1984 Simon et al. ............... 219/432
4,491,235 A * 1/1985 Fournier et al. .......... 99/422 X
4,492,853 A * 1/1985 Lam ........................... 219/432
4,555,616 A * 11/1985 O'Brien ...................... 219/432
5,129,314 A * 7/1992 Hu .............................. 99/422
5,203,255 A * 4/1993 Wells et al. .................. 99/483
5,239,916 A * 8/1993 Hu .............................. 99/422
5,421,271 A * 6/1995 Sui ............................. 108/50
5,687,642 A 11/1997 Chao
5,778,768 A * 7/1998 McClean ..................... 99/422

FOREIGN PATENT DOCUMENTS

DE 297 09 765 U1 10/1997
DE 298 20 731 U1 3/1999
DE 199 06 520 A1 8/2000
EP 0 629 820 A2 12/1994

* cited by examiner

*Primary Examiner*—Timothy F. Simone
(74) *Attorney, Agent, or Firm*—Michael J. Striker

(57) ABSTRACT

The cooking station includes a working panel (2) or other cooking station component providing a working or cooking surface (2*s*); a wok-type glass-ceramic bowl (1) built into an opening (O) provided in the working panel (2) or other cooking station component, which has an upstanding edge (1*e*) and a sunken curved heating surface (1*s*), the upstanding edge (1*e*) being arranged sunken to a predetermined depth below the working or cooking surface or flush with the working or cooking surface (2*s*); attaching components for rigidly mounting the glass-ceramic bowl (1) in the opening in the working or cooking surface and a bottom pan (3) attached under the glass-ceramic bowl (1) and to the attaching components, which provides support for heating elements of the cooking station.

11 Claims, 3 Drawing Sheets

COOKING STATION WITH A GLASS-CERAMIC BOWL HAVING A SUNKEN CURVED HEATING SURFACE

BACKGROUND OF THE INVENTION

1. Field of the Invention

The present invention relates to a cooking station with a glass-ceramic bowl, which has a circumferential upstanding (not flanged) edge and a sunken curved heating surface.

2. Description of the Related Art

Glass-ceramic cooking ware including curved bowls, so-called woks, has been marketed for many years. This type of cooking ware and its manufacture are described, for example, in DE 199 06 520 A1.

The bowls are used first directly as cooking vessels, i.e. the curved heated surface is directly employed for food preparation and second these curved bowls are employed as supports for metallic woks, which are heated by induction and in which the food is directly prepared. The metallic, typically spherical, curved wok bowl sits in an appropriately shaped glass-ceramic bowl. An induction coil is arranged under the glass-ceramic bowl.

Glass-ceramic vessels are not only formed as curved bowls, but also trough-shaped or oval cooking units made of glass-ceramic material.

Cooking stations with glass-ceramic bowls of the prior art with a circumferential upstanding edge are typically formed as stand-alone units with a table-mounted frame, which receives the glass-ceramic bowl and the required heating device. This stand-alone cooking unit is typically placed on a working panel in the kitchen. This sort of cooking unit is described in DE 297 09 765 U1 and U.S. Pat. No. 5,687,642.

The frame of this known cooking unit is comparatively bulky and awkward. It takes up a comparatively great amount of space on the working panel. The handling of this cooking unit is comparatively troublesome because of the room required for the frame with the glass-ceramic bowl and the heating device.

A glass-ceramic supporting bowl for a metallic wok has been built into a conventional working panel of a modern kitchen. This glass-ceramic support vessel is described in DE 298 20 731 U1, which is equivalent to EP 0 629 820 A2. In the known case the supporting vessel has a flange-shaped circular bordering edge, with which it bears in an opening or cavity in the working panel. This engineering disadvantageously requires an expensive molded or shaped glass-ceramic bowl.

SUMMARY OF THE INVENTION

It is an object of the present invention to provide a cooking station of the above-described type with a flangeless glass-ceramic vessel, which can be built into the working panel or a suitable working environment in a simple and safe manner, even when the construction of a supporting or bearing flange is faulty.

According to the invention the cooking station comprises a working panel or other cooking station component providing a working or cooking surface; a glass-ceramic bowl built into an opening provided in the working panel or other cooking station component, the glass-ceramic bowl having an upstanding edge and a sunken curved heating surface, the upstanding edge being arranged sunken to a predetermined depth below the working or cooking surface or flush with the working or cooking surface; attaching means for attaching the glass-ceramic bowl to the working panel or other cooking station component and a bottom pan attached under the glass-ceramic bowl, the bottom pan providing means for supporting heating elements for heating the glass-ceramic bowl.

The features of the invention advantageously provide a cooking station with the foregoing glass-ceramic bowl with an upstanding edge, without a table frame and without a "hanging holder". This means that the upstanding edge does not have a flat bearing surface on a flanged upper edge so that the glass-ceramic bowl can be supported by means of the flat peripheral bearing surface provided e.g. on the underside of the flanged edge.

Different alternative structures are conceivable for building the glass-ceramic bowl into the cooking station.

A first embodiment of the invention provides attaching means comprising at least two attaching members arranged on opposite sides of the opening or a circumferential attaching member extending around the opening and at least one retaining bracket. The at least two attaching members or said circumferential attaching member are or is rigidly attached to a peripheral edge of the working or cooking surface around the opening in the working panel or cooking station component . The lower end of the at least one retaining bracket is connected to the bottom pan and to the at least two attaching members or to the circumferential attaching member. The upper end of the at least one retaining bracket is curved so that the glass-ceramic bowl rests on the upper end of the at least one retaining bracket with the upstanding edge flush with the working or cooking surface.

In order to avoid damage because of direct contact between the glass-ceramic surface of the bowl and metallic parts, buffering spacers are provided on bearing surfaces between the glass-ceramic bowl and a curved portion of the retaining bracket. This guarantees a definite spacing between both parts.

A transitional joint between the edge of the glass-ceramic bowl and the working panel or other cooking station component is provided in order to prevent cooking material or cleaning agents from falling into the interior of the cooking station. This transitional joint comprises a permanently elastic adhesive material.

So that an exactly flush termination of the upper edge of the built in glass ceramic bowl with the working or cooking surface is obtained, the invention provides a height adjusting device between the attaching means and the bottom pan.

A second embodiment of the invention provides a frame part with a frame member overlapping the peripheral edge of the opening in the cooking or working surface. In this other embodiment the frame part is used to mount the glass-ceramic bowl in the opening of the cooking or working surface by means of a permanently elastic adhesive and it is also connected with the bottom pan.

This sort of construction permits the glass-ceramic bowl to be pre-mounted in the frame part and then built into the working surface as a structural unit. Then later, if a repair is necessary, the structural unit can be taken out from the working surface.

In order to stabilize the glass-ceramic bowl mechanically an embodiment is provided, in which a curved metallic retaining bracket is provided which is connected at one end with the frame part and provides a bearing surface for the glass-ceramic bowl at the other end.

In order to avoid a damaging direct contact between the glass-ceramic material of the bowl and metal components or parts and to provide a permanent fixed mounting of the glass-ceramic bowl in the frame part and/or in relation to the mounting bracket, buffering spaces are provided on the bearing surfaces between the glass-ceramic bowl and the retaining bracket. The glass-ceramic bowl is connected also with this retaining bracket by means of a permanently elastic adhesive material.

In a preferred embodiment in which the cooking station has a continuously open glass-ceramic bowl the frame part is constructed with an overlapping frame member, which overlaps the upper edge of the glass-ceramic bowl so that upper edge is flush or even with the working or cooking surface.

Alternatively another preferred embodiment provides a frame part with its overlapping frame member so that the upper edge of the glass-ceramic bowl is sunken a predetermined amount for receipt of a cover, whose upper surface is even or flush with the cooking or working surface.

In this latter embodiment the cooking station would have a closed working surface when the glass-ceramic bowl is not in use.

BRIEF DESCRIPTION OF THE SEVERAL VIEWS OF THE DRAWING

The objects, features and advantages of the invention will now be described in more detail with the aid of the following description of the preferred embodiments, with reference to the accompanying figures in which.

DETAILED DESCRIPTION OF THE PREFERRED EMBODIMENTS

Figure 1:
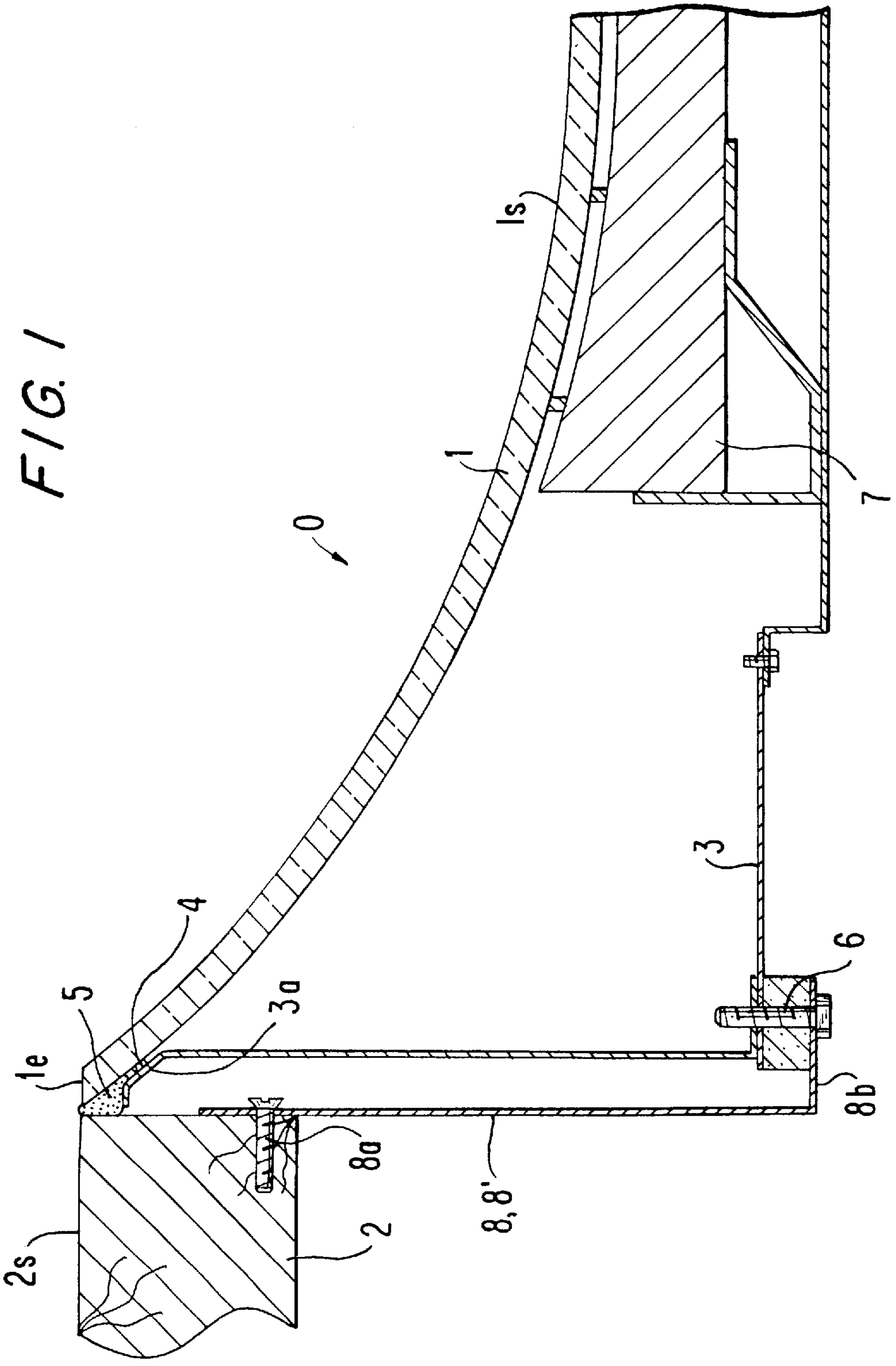
FIG. 1 is a schematic cross-sectional view through a first embodiment of a frame-less glass-ceramic bowl or wok-bowl according to the invention set in the working panel so that its upper edge is flush with the working surface.

FIG. 1 shows a glass-ceramic bowl 1 with an upstanding edge 1*e*, which is built into a suitable opening O in the working panel 2 without a frame. Respective attaching members 8 that are each bent at their free ends are attached by means of screw connections 8*a* on at least two opposite sides of opening O and to the inner edge of the opening O in the typically wooden working panel 2. However a single circumferential attaching member 8' can be provided in alternative embodiments. A retaining bracket 3*a* and a bottom pan 3 are attached to the free end 8*b* of each attaching member 8*a* by means of another screw connection. A level adjusting device 6 is provided for this other screw connection. The glass-ceramic bowl 1 is mounted on the retaining bracket or brackets 3*a*. Direct metal-glass-ceramic contact is prevented by means of a suitable buffering spacer or spacers 4.

The bottom pan 3 connected with each retaining bracket 3*a* supports an induction heating body 7, which is pressed in a suitable manner against the underside of the glass-ceramic bowl.

The induction heating body 7 heats a metallic wok supported by the glass-ceramic bowl 1, which is not shown in FIG. 1. However a heated surface 1*s* of the glass-ceramic bowl 1 can also be used for direct food preparation, when a radiant heating body is used instead of the induction heating body 7. This is also true for the embodiments shown in FIGS. 2 and 3.

The bottom pan 3 and the glass-ceramic bowl can be adjusted in height by means of height adjusting unit 6, so that a flush termination of the upper edge 1*e* of the glass-ceramic bowl 1 in the working panel 2 is provided. The gap arising between the upper edge of the glass-ceramic bowl 1 and the working panel 2 is closed with an adhesive seam 5 comprising a suitable elastic adhesive.

Figure 2:
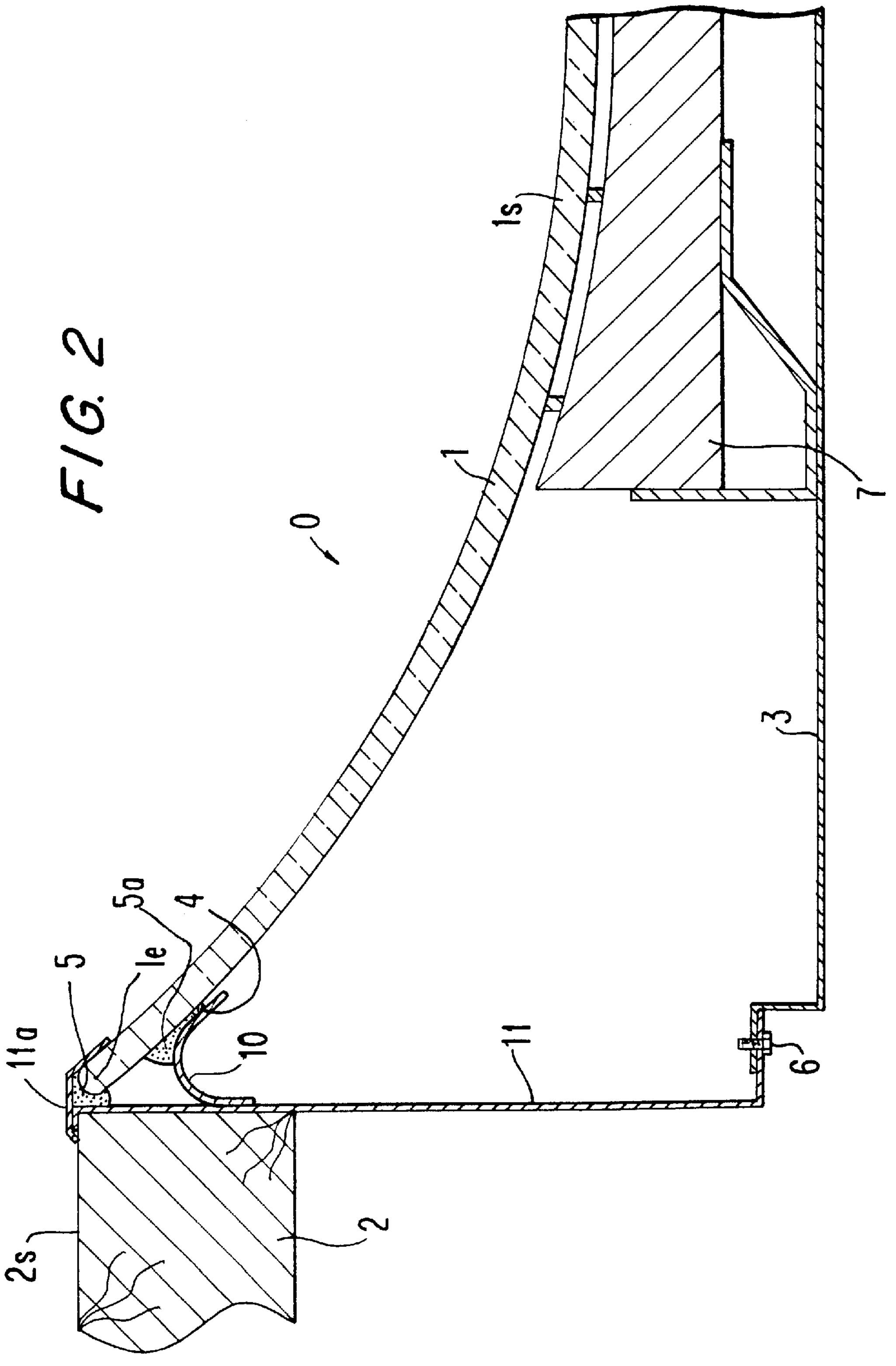
FIG. 2 is a schematic cross-sectional view through a second embodiment of a glass-ceramic bowl or wok-bowl according to the invention set in the working panel by means of an overlapping frame so that its upper edge is flush with the working surface.
Figure 3:
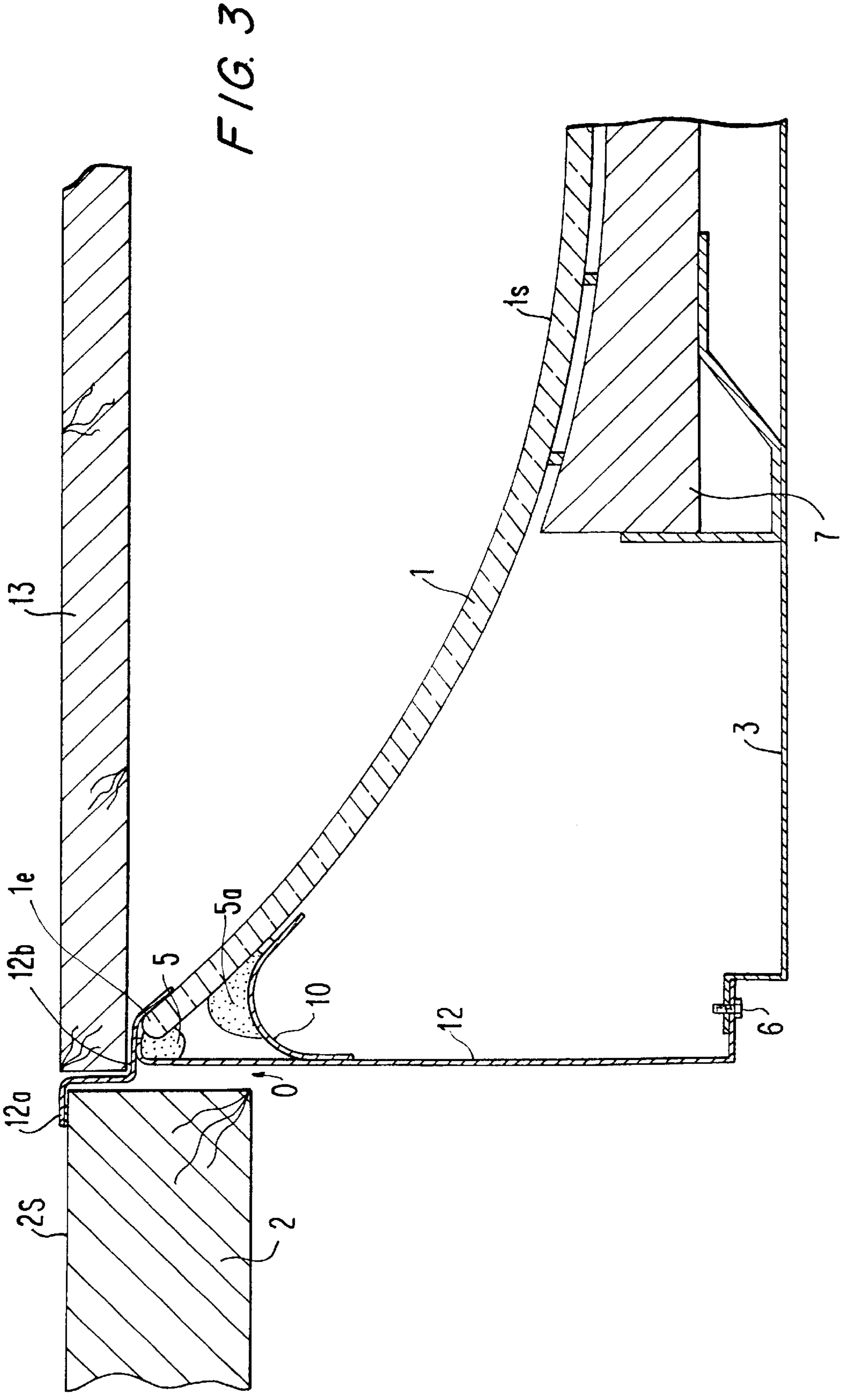
FIG. 3 is a schematic cross-sectional view through a third embodiment of a framed glass-ceramic bowl or wok-bowl according to FIG. 2, but with an edge sunken or lowered relative to the working surface to a predetermined depth, which corresponds to the thickness of the cover for this bowl.

In the same way the glass-ceramic bowl can be built into other working environments, for example stainless steel housings, stone panels, plastic or other materials instead of a working panel, as shown, which is also true of the embodiments shown in FIGS. 2 and 3. It is even conceivable to build the glass-ceramic bowl according to the invention into a glass-ceramic cooking surface.

As can be seen, by means of the invention it is possible to provide a glass-ceramic bowl with an upstanding, i.e. not flanged, edge 1*e*, securely built into an opening O provided in a working panel 2. FIG. 1 shows a frame-less embodiment of the glass-ceramic bowl 1, i.e. with the terminating edge 1*e* of the bowl connected flush with the working surface 2*s* by means of the adhesive seam 5. In contrast in the embodiment of FIG. 2 the glass-ceramic bowl 1 is built into the working panel 2 by means of an overlapping frame. The basic components of the embodiment according to FIG. 2 are similar to or the same as those of FIG. 1 and are thus provided with the same reference numbers. Instead of the attachment element 8 as in FIG. 1 in the embodiment according to FIG. 2*a* circumferential frame part 11 is provided with an overlapping frame member 11*a*.

The glass-ceramic bowl 1 is connected by a suitable elastic adhesive 5 with the overlapping frame part 11. This frame part 11 is connected again by means of the screw connection 6 with the bottom pan 3, which supports the electrical components of the induction heating body 7.

In so far as it is needed, the glass-ceramic bowl 1 can be equipped with an optional retaining bracket 10 for support. The retaining bracket 10 is connected by means of a detachable screw (not shown) with the frame part 11 and with the bottom of the glass-ceramic bowl by means of an adhesive 5*a*. In order to avoid the already mentioned metal-glass-ceramic contact suitable spacers 4 are provided.

The frame part 11 may be connected by means of the frame member 11*a* in the opening O of the working panel 2. In so far as required, the entire unit can also be connected with (not shown) attaching means with the working panel 2. In the already described embodiments according to FIGS. 1 and 2 the upper edge 1*e* of the glass-ceramic bowl 1 is flush, even or at the same level as the working or cooking surface 2*s*. In the embodiment shown in FIG. 3, which is otherwise the same as the embodiment of FIG. 2, the upper edge 1*e* of the glass-ceramic bowl 1 is lowered or sunken, to provide space for covering the glass-ceramic bowl 1. For the purpose of covering the glass-ceramic bowl 1 a suitable cover 13, for example made of glass, glass-ceramic or of the material of the working surface is provided. Thus when the wok-cooking device is not in use it can be covered with the cover 13, which provides additional working space. The holding or fixing of the cover 13 is accomplished by means of a suitable frame structure.

The glass-ceramic bowl 1 is connected by means of a suitable elastic adhesive 5 with the overlapping frame part 12, which is somewhat modified in contrast to the overlapping fame part 11 of FIG. 2 because of the lowering of the upper edge 1*e* of the glass-ceramic bowl 1. The frame part 12 is connected similarly by means of the screw connection 6 with the bottom pane 3, which supports an electrical component of the induction heating body 7.

In so far as required, the glass-ceramic bowl 1 can be supported with an optional retaining bracket 10. The retaining bracket 10 is connected by means of an unshown detachable screw connection with the frame part 12 and with the bottom of the glass-ceramic bowl by means of an adhesive 5*a*.

Suitable spacers 4 are provided to avoid the already mentioned metal-glass ceramic contact.

The frame part 12 may be connected by means of the frame member 12*a* in the opening in the working panel 2. In so far as it is needed, the entire unit can be also connected with attaching means (unshown) with the working panel 2.

The frame part 12 moreover has a low-lying frame member 12*b*, on which the cover 13 may be supported.

The disclosure in German Patent Application 101 32 899.0-16 of Jul. 6, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a cooking area with a glass-ceramic dish having a sunken curved heated surface, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A cooking station comprising a working panel (2) or other cooking station component providing a working or cooking surface (2*s*);

a glass-ceramic bowl (1) built into an opening (O) provided in the working panel (2) or other cooking station component, said glass-ceramic bowl (1) having an upstanding edge (1*e*) and a sunken curved heating surface (1*s*), said upstanding edge (1*e*) being arranged sunken to a predetermined depth below said working or cooking surface or flush with said working or cooking surface (2*s*);

attaching means for attaching the glass-ceramic bowl (1) to the working panel (2) or other cooking station component; and a bottom pan (3) attached under the glass-ceramic bowl (1), said bottom pan (3) providing means for supporting heating elements for heating the glass-ceramic bowl.

2. The cooking station as defined in claim 1, wherein said attaching means comprise at least two attaching members (8) arranged on opposite sides of the opening or a circumferential attaching member (8') extending around said opening and at least one retaining bracket (3*a*), said at least one retaining bracket having an upper end and a lower end;

wherein said at least two attaching members (8) or said circumferential attaching member (8') are or is rigidly attached to a peripheral edge of the working or cooking surface around the opening (O) in the working panel or cooking station component, said lower end of said at least one retaining bracket (3*a*) is connected to the bottom pan (3) and to said at least two attaching members or to said circumferential attaching member and said upper end of said at least one retaining bracket (3*a*) is curved so that the glass-ceramic bowl (1) rests on said upper end of said at least one retaining bracket (3*a*) with said upstanding edge flush with the working or cooking surface.

3. The cooking station as defined in claim 2, further comprising buffering spacers (4) provided on curved bearing surfaces between said at least one retaining bracket (3*a*) and said glass-ceramic bowl (1), and wherein said buffering spacers (4) guarantee a predetermined spacing between said at least one retaining bracket (3*a*) and said glass-ceramic bowl (1).

4. The cooking station as defined in claim 2 or 3, further comprising a transitional joint between said upstanding edge of said glass-ceramic bowl (1) and said working panel or cooking station component and wherein said transitional joint comprises an adhesive seam (5) and said adhesive seam (5) consists of a permanently elastic adhesive material.

5. The cooking station as defined in claim 2 or 3, further comprising a height adjusting device connecting said bottom pan (3) to said at least two attaching members (8) or said circumferential attaching member (8').

6. The cooking station as defined in claim 1, wherein said attaching means comprises a frame part (11, 12) on which the glass-ceramic bowl (1) is mounted by means of a portion (5) of permanently elastic adhesive material, said frame part is connected to the bottom pan (3) and said frame part (11, 12) includes a frame member (11*a*, 12*a*) overlapping a peripheral edge of the opening in the cooking or working surface.

7. The cooking station as defined in claim 6, further comprising a curved metallic retaining member (10) connected at one end thereof with said frame part (11, 12) and at another end thereof provides a bearing surface for the glass-ceramic bowl (1).

8. The cooking station as defined in claim 7, further comprising buffering spacers (4) provided between said bearing surface of said retaining member (10) and said glass-ceramic bowl (1) and another portion (5*a*) of said permanently elastic adhesive material connecting said retaining member (10) and said glass-ceramic bowl (1).

9. The cooking station as defined in claim 6, 7 or 8, wherein said frame part (11) is formed with said overlapping frame member (11*a*) so that said upper edge of the glass-ceramic bowl (1) is flush with the cooking or working surface.

10. The cooking station as defined in claim 6, wherein said frame part (11) is formed with said overlapping frame member (11*a*) so that said upper edge of the glass-ceramic bowl (1) is sunken a predetermined distance below said cooking or working surface to accommodate a cover (13) and said cover is formed so that an upper surface of said cover is flush or even with said cooking or working surface when said cover is placed on said glass-ceramic bowl (1).

11. The cooking station as defined in claim 10, further comprising said cover (13) and said cover (13) is made of the same material as said working panel or said cooking station component.

* * * * *